United States Patent
Xiang et al.

(10) Patent No.: US 10,027,565 B2
(45) Date of Patent: Jul. 17, 2018

(54) INTER-ENODEB COMMUNICATION METHOD AND DEVICE

(71) Applicant: ZTE Corporation, Shenzhen (CN)

(72) Inventors: Jiying Xiang, Shenzhen (CN); Peng Geng, Shenzhen (CN); Gang Qiu, Shenzhen (CN); Zhen Ren, Shenzhen (CN); Chen Huang, Shenzhen (CN); Nan Li, Shenzhen (CN); Donglei Chen, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 5 days.

(21) Appl. No.: 15/021,381

(22) PCT Filed: Jun. 16, 2014

(86) PCT No.: PCT/CN2014/079999
§ 371 (c)(1),
(2) Date: Jun. 22, 2016

(87) PCT Pub. No.: WO2014/187427
PCT Pub. Date: Nov. 27, 2014

(65) Prior Publication Data
US 2016/0308741 A1    Oct. 20, 2016

(30) Foreign Application Priority Data

Sep. 13, 2013  (CN) .......................... 2013 1 0417995

(51) Int. Cl.
*H04B 7/14* (2006.01)
*H04L 12/26* (2006.01)
(Continued)

(52) U.S. Cl.
CPC ............ *H04L 43/08* (2013.01); *H04B 7/155* (2013.01); *H04W 28/16* (2013.01); *H04W 72/0413* (2013.01)

(58) Field of Classification Search
CPC .. H04L 43/08; H04W 72/0413; H04W 28/16; H04B 7/155
See application file for complete search history.

(56) References Cited

U.S. PATENT DOCUMENTS

2012/0282966 A1* 11/2012 Koo ...................... H04L 1/0026
                                                           455/517
2013/0083681 A1*  4/2013 Ebrahimi Tazeh Mahalleh
                                  ............................ H04L 5/0057
                                                           370/252

FOREIGN PATENT DOCUMENTS

CN    101552984 A    10/2009
CN    102223645 A    10/2011
(Continued)

OTHER PUBLICATIONS

International Search Report for corresponding application No. PCT/CN2014/079999 filed on Jun. 16, 2014; dated Sep. 19, 2014.
(Continued)

*Primary Examiner* — Afshawn M Towfighi
(74) *Attorney, Agent, or Firm* — Cantor Colburn LLP

(57) ABSTRACT

Provided are an inter-eNodeB communication method and device, wherein the method includes that: an inter-eNodeB interface transmission condition is detected, a cooperation mode of inter-eNodeB communication is determined according to the inter-eNodeB interface transmission condition, and the inter-eNodeB communication is performed according to the cooperation mode. The present disclosure solves the problem of inter-eNodeB cooperation in different
(Continued)

inter-eNodeB interface conditions in the related art, thus improving the effect of the inter-eNodeB cooperation.

16 Claims, 7 Drawing Sheets

(51) Int. Cl.
　　　*H04W 28/16*　　(2009.01)
　　　*H04B 7/155*　　(2006.01)
　　　*H04W 72/04*　　(2009.01)

(56) References Cited

FOREIGN PATENT DOCUMENTS

| | | |
|---|---|---|
| CN | 103024753 A | 4/2013 |
| EP | 2426829 A1 | 3/2012 |
| WO | 2011076266 A1 | 6/2011 |
| WO | 2012084035 A1 | 6/2012 |

OTHER PUBLICATIONS

European Search Report for corresponding application EP 14 80 1684: Report dated Aug. 19, 2016.

\* cited by examiner

INTER-ENODEB COMMUNICATION METHOD AND DEVICE

TECHNICAL FIELD

The present disclosure relates to the field of communications, particularly to an inter-eNodeB communication method and device.

BACKGROUND

In Long Term Evolution (LTE) and LTE-Advanced (LTE-A) standards, in order to improve system throughput, especially to improve the quality of service and the throughput of a cell edge, Inter-cells cooperation and interference coordination become more and more important.

In the present LTE and LTE-A standards, Inter-eNodeB information is transmitted through an X2 interface, wherein the Inter-eNodeB information comprises at lease one of the followings: information of an interference load state, data and control information of User Equipment (UE) that needs to be switched, information of an Almost Blank Subframe (ABS) pattern and so on. Inter-eNodeB interference coordination may be performed to a certain degree by using the above information. However, inter-eNodeB cooperation and interference coordination, such as Coordinated Multiple Points (CoMP), International Conference On Intelligent Computing (ICIC), centralized scheduling and so on, may not be better implemented merely by using the above information.

It is necessary to enhance an inter-eNodeB information interface so that inter-eNodeB cooperation and interference coordination can be better implemented by modes including a mode of CoMP, a mode of centralized scheduling and so on. At present, some companies have applied mediums including optical fibers, microwaves and so on to connect cells, and exchange inter-eNodeB information and data. However, inter-eNodeB interfaces, which have not been defined by a standard, are private interfaces defined by device manufacturers, and devices provided by different device manufacturers can hardly communicate through these private interfaces.

Besides, inter-cells cooperation based on an RRM function may be performed through an X2 interface in the present LTE-A standards. For example, high interference information is interacted through the interface to perform inter-cells ICIC cooperation; ABS pattern information is interacted through the interface to perform ABS pattern-based inter-cells cooperation and interference coordination and so on.

In the related art, it is found that different interface operating environments among eNodeBs are not considered in the related art, and the same coordination mechanism is applied in inter-eNodeB communication, thus the same coordination mechanism can hardly adapt to networking environments.

At present, no solution has been provided yet to solve the problem of how to perform the inter-eNodeB cooperation in different inter-eNodeB interface conditions in the related art.

SUMMARY

Embodiments of the present disclosure provide an inter-eNodeB communication method and device, so as to solve the problem of how to perform the inter-eNodeB cooperation in different inter-eNodeB interface conditions in the related art.

According to an aspect of the present disclosure, an inter-eNodeB communication method is provided, comprising: detecting an inter-eNodeB interface transmission condition; determining a cooperation mode of inter-eNodeB communication according to the detected inter-eNodeB interface transmission condition; and performing the inter-eNodeB communication according to the determined cooperation mode.

In an example embodiment of the present disclosure, detecting the inter-eNodeB interface transmission condition comprises: initiating, by a centralized control unit, a signaling for detecting the inter-eNodeB interface transmission condition, wherein the centralized control unit is coupled with at least one eNodeB; and determining the cooperation mode of the inter-eNodeB communication according to the detected inter-eNodeB interface transmission condition comprises: receiving, by the centralized control unit, the inter-eNodeB interface transmission condition returned by each of the at least one eNodeB, and determining, by the centralized control unit, the cooperation mode of the inter-eNodeB communication of the at least one eNodeB according to the received inter-eNodeB interface transmission condition.

In an example embodiment of the present disclosure, detecting the inter-eNodeB interface transmission condition comprises: initiating, by an eNodeB, detection of the inter-eNodeB interface transmission condition between the eNodeB and at least one other eNodeB; and determining the cooperation mode of the inter-eNodeB communication according to the detected inter-eNodeB interface transmission condition comprises: determining, by the eNodeB, according to the detected inter-eNodeB interface transmission condition between the eNodeB and the at least one other eNodeB, the cooperation mode of the inter-eNodeB communication with the at least one other eNodeB.

In an example embodiment of the present disclosure, detecting the inter-eNodeB interface transmission condition comprises: detecting the inter-eNodeB interface transmission condition when a network load is lower than a threshold value.

In an example embodiment of the present disclosure, the cooperation mode of the inter-eNodeB communication comprises at least one of followings: a cooperation mode of a physical layer, a cooperation mode of a Media Access Control (MAC) layer, and a cooperation mode based on a Radio Resource Management (RRM) function.

In an example embodiment of the present disclosure, determining the cooperation mode of the inter-eNodeB communication according to the detected inter-eNodeB interface transmission condition comprises: applying the cooperation mode of the physical layer when the inter-eNodeB interface transmission condition satisfies a requirement of the cooperation mode of the physical layer, and/or applying the cooperation mode of the MAC layer when the inter-eNodeB interface transmission condition fails to satisfy the requirement of the cooperation mode of the physical layer, but satisfies a requirement of the cooperation mode of the MAC layer, and/or applying the cooperation mode based on the RRM function when the inter-eNodeB interface transmission condition fails to satisfy the requirement of the cooperation mode of the MAC layer, but satisfies a requirement of the cooperation mode based on the RRM function.

In an example embodiment of the present disclosure, the inter-eNodeB interface transmission condition comprises at least one of followings: a transmission delay, a delay jitter, and a transmission bandwidth.

In an example embodiment of the present disclosure, performing the inter-eNodeB communication according to the determined cooperation mode comprises: performing the inter-eNodeB communication according to the determined cooperation mode through an Internet Protocol, IP-base interface.

According to another aspect of the present disclosure, an inter-eNodeB communication device is provided, comprising: a detecting component, configured to detect an inter-eNodeB interface transmission condition; a determining component, configured to determine a cooperation mode of inter-eNodeB communication according to the detected inter-eNodeB interface transmission condition; and a communicating component, configured to perform the inter-eNodeB communication according to the determined cooperation mode.

In an example embodiment of the present disclosure, the detecting component and the determining component are located in a centralized control unit, wherein the centralized control unit is coupled with at least one eNodeB; and the communicating component is located in an eNodeB.

In an example embodiment of the present disclosure, the detecting component, the determining component and the communicating component are located in an eNodeB.

In an example embodiment of the present disclosure, the detecting component is configured to detect the inter-eNodeB interface transmission condition when a network load is lower than a threshold value.

In an example embodiment of the present disclosure, the cooperation mode of the inter-eNodeB communication comprises at least one of followings: a cooperation mode of a physical layer, a cooperation mode of a Media Access Control (MAC) layer, and a cooperation mode based on a Radio Resource Management (RRM) function.

In an example embodiment of the present disclosure, the determining component is configured to apply the cooperation mode of the physical layer when the inter-eNodeB interface transmission condition satisfies a requirement of the cooperation mode of the physical layer, and/or apply the cooperation mode of the MAC layer when the inter-eNodeB interface transmission condition fails to satisfy the requirement of the cooperation mode of the physical layer, but satisfies a requirement of the cooperation mode of the MAC layer, and/or apply the cooperation mode based on the RRM function when the inter-eNodeB interface transmission condition fails to satisfy the requirement of the cooperation mode of the MAC layer, but satisfies a requirement of the cooperation mode based on the RRM function.

In an example embodiment of the present disclosure, the inter-eNodeB interface transmission condition comprises at least one of followings: a transmission delay, a delay jitter, and a transmission bandwidth.

In an example embodiment of the present disclosure, the communicating component is configured to perform the inter-eNodeB communication according to the determined cooperation mode through an Internet Protocol, IP-base interface.

Through the embodiments of the present disclosure, an inter-eNodeB interface transmission condition is detected, a cooperation mode of inter-eNodeB communication is determined according to the detected inter-eNodeB interface transmission condition, and the inter-eNodeB communication is performed according to the determined cooperation mode, thus solving the problem of how to perform the inter-eNodeB cooperation in different inter-eNodeB interface conditions in the related art, and improving the effect of the inter-eNodeB cooperation.

BRIEF DESCRIPTION OF THE DRAWINGS

The accompanying drawings illustrated herein are used for providing further understanding to the embodiments of the present disclosure and form a part of the present application. The schematic embodiments of the present disclosure and the description thereof are used for explaining the present disclosure, instead of forming improper limitation to the present disclosure. In the accompanying drawings.

DETAILED DESCRIPTION OF THE EMBODIMENTS

It needs to be noted that the embodiments in the present application and the characteristics in the embodiments may be combined with each other if there is no conflict. The present disclosure will be expounded hereinafter with reference to the accompanying drawings and in combination with the embodiments.

Figure 1:
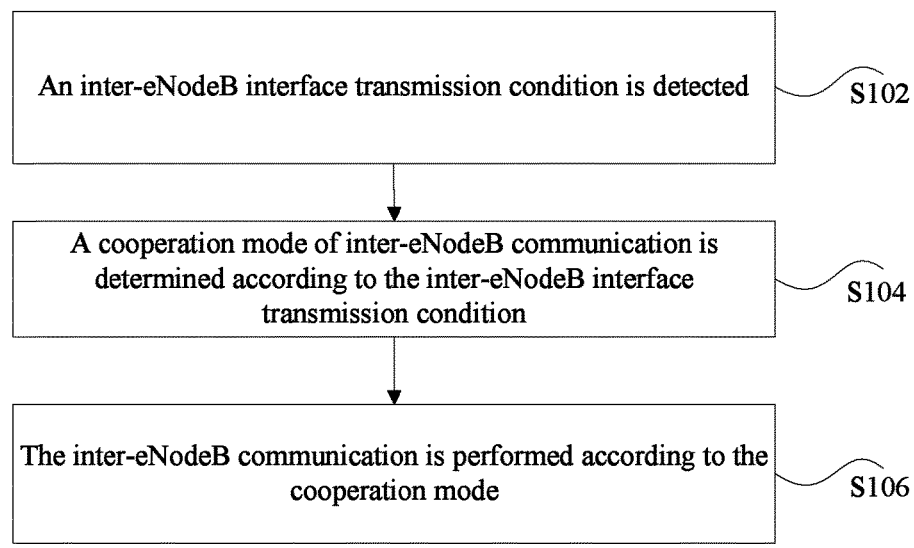
FIG. 1 is a flowchart of an inter-eNodeB communication method according to an embodiment of the present disclosure.

An inter-eNodeB communication method is provided in the present embodiment. FIG. 1 is flowchart of an inter-eNodeB communication method according to an embodiment of the present disclosure. As shown in FIG. 1, the method includes the following steps.

Step 102: An inter-eNodeB interface transmission condition is detected.

Step 104: A cooperation mode of inter-eNodeB communication is determined according to the detected inter-eNodeB interface transmission condition.

Step 106: The inter-eNodeB communication is performed according to the determined cooperation mode.

By means of the steps above, the inter-eNodeB interface transmission condition is detected, and the cooperation mode of inter-eNodeB communication is determined according to the detected inter-eNodeB interface transmission condition, thus implementing the inter-eNodeB communication by adaptively applying different types of cooperation modes, solving the problem of how to perform the inter-eNodeB cooperation in different inter-eNodeB interface conditions in the related art, and improving the effect of the inter-eNodeB cooperation.

In the present embodiment, a solution for detecting the inter-eNodeB interface transmission condition may be a centralized control solution, and may be also a distributed control solution, and these two example implementation modes will be respectively described below.

Centralized Control Solution

A centralized control unit initiates a signaling for detecting the inter-eNodeB interface transmission condition, wherein the centralized control unit is coupled with at least one eNodeB. The centralized control unit receives the inter-eNodeB interface transmission condition returned by each of the at least one eNodeBs, and the centralized control unit determines the cooperation mode of the inter-eNodeB communication of the at least one eNodeB according to the received inter-eNodeB interface transmission condition.

The centralized control solution will be described below in combination with an example.

Figure 2:
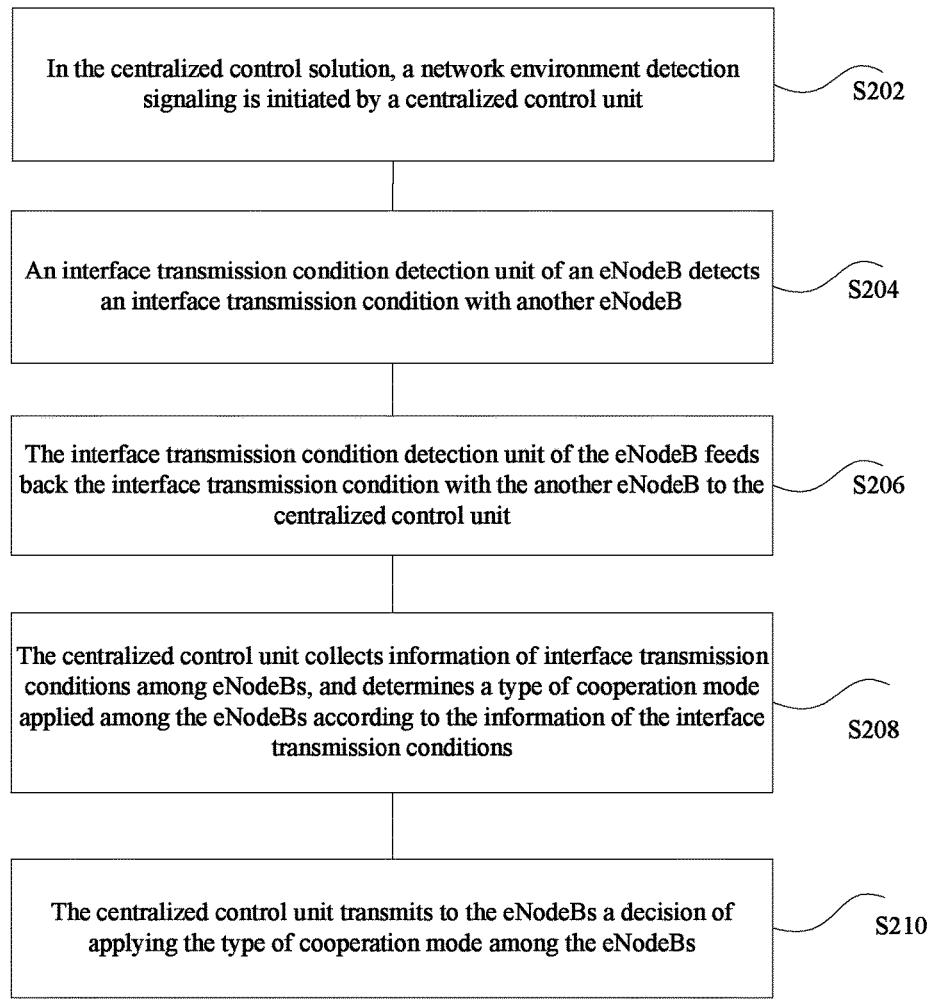
FIG. 2 is a flowchart of centralized control according to an embodiment of the present disclosure.
Figure 3:
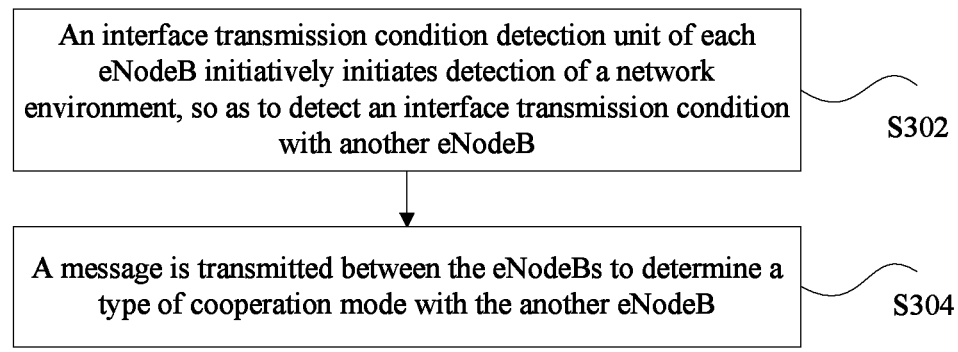
FIG. 3 is a flowchart of distributed control according to an embodiment of the present disclosure.

FIG. 2 is a flowchart of the centralized control solution according to an embodiment of the present disclosure. As shown in FIG. 3, the centralized control solution includes the following steps.

Step 202: In the centralized control solution, a network environment detection signaling is initiated by a centralized control unit.

Step 204: An interface transmission condition detection unit of an eNodeB detects an interface transmission condition between the eNodeB and at least one another eNodeB.

Step 206: The interface transmission condition detection unit of the eNodeB feeds back the interface transmission condition between the eNodeB and the at least one another eNodeB to the centralized control unit.

Step 208: The centralized control unit collects information of interface transmission condition between the eNodeB and the at least one other eNodeB, and determines, according to the information of the interface transmission condition between the eNodeB and the at least one other eNodeB, a type of cooperation mode applied between the eNodeB and the at least one other eNodeB.

Step 210: The centralized control unit transmits to the at least one eNodeB a decision of applying the type of cooperation mode between the eNodeB and the at least one other eNodeB.

Distributed Control Solution

An eNodeB initiates detection of the inter-eNodeB interface transmission condition between the eNodeB and at least one other eNodeB; and that the cooperation mode of the inter-eNodeB communication is determined according to the detected inter-eNodeB interface transmission condition includes that: the eNodeB determines, according to the detected inter-eNodeB interface transmission condition between the eNodeB and the at least one other eNodeB, the cooperation mode of the inter-eNodeB communication with the at least one other eNodeB.

The distributed control solution will be described below in combination with an example.

FIG. 3 is a flowchart of the distributed control solution according to an embodiment of the present disclosure. As shown in FIG. 3, the distributed control solution includes the following steps.

Step 302: An interface transmission condition detection unit of each eNodeB initiatively initiates detection of a network environment, so as to detect an interface transmission condition with another eNodeB.

Step 304: A message is transmitted between the eNodeBs to determine a type of cooperation mode with another eNodeB.

In the present embodiment and example implementation modes, the detection of the inter-eNodeB interface transmission condition may be initiated in different conditions. In an example embodiment, the inter-eNodeB interface transmission condition may be detected when a network load is lower than a threshold value. In an example embodiment, selection of the threshold value may be related to a load capacity of the whole network. An appropriate threshold value may be selected to avoid reduction in frequency efficiency and cell throughput caused by the initiation of the detection of the inter-eNodeB interface transmission condition when a network load is excessively large.

In the present embodiment, there may be various cooperation modes of the inter-eNodeB communication, and the cooperation modes may include at least one of the followings: a cooperation mode of a physical layer, a cooperation mode of an MAC layer, and a cooperation mode based on an RRM function. The cooperation mode based on the physical layer includes CoMP and so on, the cooperation based on the MAC layer include centralized scheduling, and the cooperation based on the RRM function includes cooperation based on an ABS pattern, (e)ICIC and so on.

In the present embodiment, different conditions are required to determine cooperation modes of inter-eNodeB communication according to different inter-eNodeB interface transmission, and the cooperation modes may be also selected according to different sequences according to different interface transmission conditions and system operation requirements. For example, the cooperation mode of the physical layer is applied when the inter-eNodeB interface transmission condition satisfies a requirement of the cooperation mode of the physical layer, and/or the cooperation mode of the MAC layer is applied when the inter-eNodeB interface transmission condition fails to satisfy the requirement of the cooperation mode of the physical layer, but satisfies a requirement of the cooperation mode of the MAC layer, and/or the cooperation mode based on the RRM function is applied when the inter-eNodeB interface transmission condition fails to satisfy the requirement of the cooperation mode of the MAC layer, but satisfies a requirement of the cooperation mode based on the RRM function. The inter-eNodeB interface transmission condition may include at least one of the followings: a transmission delay, a delay jitter, and a transmission bandwidth. The three cooperation modes may be used separately, and may be also used in combination.

In the present embodiment, a condition required by determining a type of cooperation mode applied among eNodeBs may be preferably judged according to the following method.

When the delay between interfaces of eNodeBs is relatively small (it is required that a transmission delay of the interface is within 1 ms according to a Hybrid Automatic Repeat Request (HARQ) time sequence requirement and the duration required by current signal processing), a delay jitter is relatively small (it is required that a transmission delay jitter of the interface is within a level of a hundred nanoseconds at most according to the HARQ time sequence requirement and the time required by the current signal processing), and a bandwidth is relatively large (determined by a system bandwidth, the number of receiving antennae, and the number of symbol bits), then the cooperation based on the physical layer is preferably performed by the eNodeBs so as to improve a system throughput and a cell edge rate, and transmit between the eNodeBs cell-level control information, UE-level control information (including a UE time-frequency domain location, a Modulation and Coding Scheme (MCS) level, a pre-coding matrix and so on) and data (including downlink transmission data and uplink receiving data). Besides, the operation of the MAC layer or the RRM level may be also performed.

When the quality of the interface between the eNodeBs fails to satisfy a requirement of the cooperation based on the physical layer, for example, the transmission time delay and the delay jitter are relatively large, or the transmission bandwidth is deficient, but the transmission delay, the delay jitter and the bandwidth can still satisfy a requirement of MAC layer coordination (according to the HARQ time sequence requirement and the time required by the current signal processing, it is required that the transmission delay of the interface needs to be within about 1 ms, and the jitter needs to be at a level of a hundred nanoseconds at most, and the bandwidth of the interface is sufficient to transmit a related control signaling and data), then the cooperation based on the MAC layer is preferably performed by the eNodeBs, so as to transmit between the eNodeBs the cell-level control information, the UE-level control information (including the UE time-frequency domain location, the MCS level, the pre-coding matrix and so on). Besides, the RRM-based cooperation may be also performed.

When the quality of the interface between the eNodeBs fails to satisfy a requirement of the cooperation based on the MAC layer, for example, the transmission time delay and the delay jitter are relatively large, or the transmission bandwidth is deficient, but the transmission delay, the delay jitter and the bandwidth can still satisfy a requirement of RRM layer coordination (it is required that the transmission delay of the interface is within a magnitude of about 10 ms, and the jitter needs to be within a magnitude of 10 ms), then the cooperation based on the RRM function may be performed by the eNodeBs so as to transmit between the eNodeBs cell-grade control information and so on.

In the present embodiment, the inter-eNodeB communication may be performed according to the cooperation mode through an IP-base interface. For example, cooperative air interface transmission is performed between the eNodeBs based on cooperation information, and the cooperation information between the eNodeBs may be transmitted through the IP-base interface.

In an example embodiment, the IP-base interface between the eNodeBs may be called as an enhanced X2 interface. The enhanced X2 interface is an IP-base interface between the eNodeBs. Besides a signaling and a content of an X2 interface defined by existing LTE standards, information required by inter-eNodeB cooperation is also added to signalings and contents carried by the enhanced X2 interface. The enhanced X2 interface may be an XP2 interface, an XM2 interface, or an XR2 interface and so on according to information required by different inter-eNodeB cooperation.

The XP2 interface, which is an IP-based interface between the eNodeBs, is an enhanced X2 interface. Besides a signaling and a content of an X2 interface defined by existing LTE standards, information required by the inter-eNodeB cooperation based on the physical layer is also added to signalings and contents carried by the XP2 interface, wherein the information required by the inter-eNodeB cooperation based on the physical layer may comprises cell subframe-level control information, UE subframe-level control information (including a UE time-frequency domain location, an MCS level, a pre-coding matrix and so on) and UE subframe-level data (including downlink transmission data and uplink receiving data) and so on.

The MX2 interface, which is an IP-based interface between the eNodeBs, is an enhanced X2 interface. Besides a signaling and a content of an X2 interface defined by existing LTE standards, information required by the inter-eNodeB cooperation based on the MAC layer is also added to signalings and contents carried by the XM2 interface, wherein the information required by the inter-eNodeB cooperation based on the MAC layer may comprises cell subframe-level control information, UE subframe-level control information (including a UE time-frequency domain location, an MCS level, a pre-coding matrix and so on) and so on.

The MR2 interface, which is an IP-based interface between the eNodeBs, is an enhanced X2 interface. Besides a signaling and a content of an X2 interface defined by existing LTE standards, information required by the inter-eNodeB cooperation based on the RRM function is also added to signalings and contents carried by the XR2 interface, wherein the information required by the inter-eNodeB cooperation based on the RRM function may comprises control information (such as an ABS pattern) of a cell-level or an upper level radio frame an upper level, and so on.

An inter-eNodeB communication device is further provided in the present embodiment. The inter-eNodeB communication device is configured to implement the method above, which has been described in the embodiment above and will not be described repeatedly here. It needs to be noted that the names of components in the following device do not form actual limitation to the components. For example, a detecting component may be expressed as "being configured to detect an inter-eNodeB interface transmission condition". All components as follows may be implemented in a processor. For example, the detecting component may be expressed as "a processor, configured to detect an inter-eNodeB interface transmission condition", or "a processor, including a detecting component" and so on.

Figure 4:
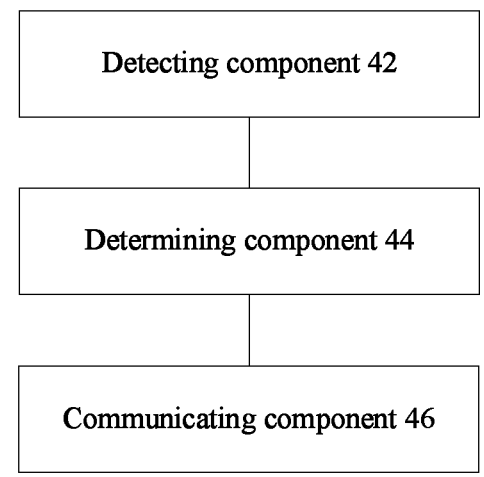
FIG. 4 is a structural diagram of an inter-eNodeB communication device according to an example embodiment of the present disclosure.

FIG. 4 is a structural diagram of an inter-eNodeB communication device according to an embodiment of the present disclosure. As shown in FIG. 4, the device 40 includes: a detecting component 42, a determining component 44 and a communicating component 46. The device will be expounded below.

The detecting component 42 is configured to detect an inter-eNodeB interface transmission condition.

The determining component 44 is configured to determine a cooperation mode of inter-eNodeB communication according to the detected inter-eNodeB interface transmission condition.

The communicating component 46 is configured to perform the inter-eNodeB communication according to the determined cooperation mode.

By means of the device above, the detecting component 42 detects the inter-eNodeB interface transmission condition and the determining component 44 determines the cooperation mode of inter-eNodeB communication according to the inter-eNodeB interface transmission condition, thus the communicating component 46 adaptively applies different types of cooperation modes to perform inter-eNodeB communication, solving the problem of how to perform the inter-eNodeB cooperation in different inter-eNodeB interface conditions in the related art, and improving the effect of the inter-eNodeB cooperation.

In the present embodiment, the detecting component 42 and the determining component 44 are located in a centralized control unit, wherein the centralized control unit is coupled with at least one eNodeB; and the communicating component 46 is located in an eNodeB. The detecting component 42, the determining component 44 and the communicating component 46 are located in an eNodeB. The detecting component 42 is configured to detect the inter-eNodeB interface transmission condition when a network load is lower than a threshold value.

In the present embodiment, the communicating component 46 is preferably configured to perform the inter-eNodeB communication according to the determined cooperation mode through an IP-base interface.

By using the device above, each eNodeB may include components including a Base Band Unit (BBU) component, an inter-BBU IP-base interface component (an enhanced X2 interface component), a centralized control unit (optional), and so on. These components may operate jointly in series to more effectively solve the problem of inter-eNodeB cooperation and interference coordination in different situations and inter-eNodeB interface conditions, thereby improving frequency efficiency and cell throughput.

Description will be provided below in combination with example embodiments and implementation modes of the present disclosure.

Different types of cooperation modes are applied adaptively in the following example embodiments, and different types of inter-cell cooperation and interference coordination solutions are applied according to inter-cell coordination information transmitted by an interface. Communication is performed among eNodeBs according to an inter-cell cooperation and interference coordination method, thus solving the problem of inter-cell cooperation and interference coordination.

Example Embodiment 1

Figure 5:
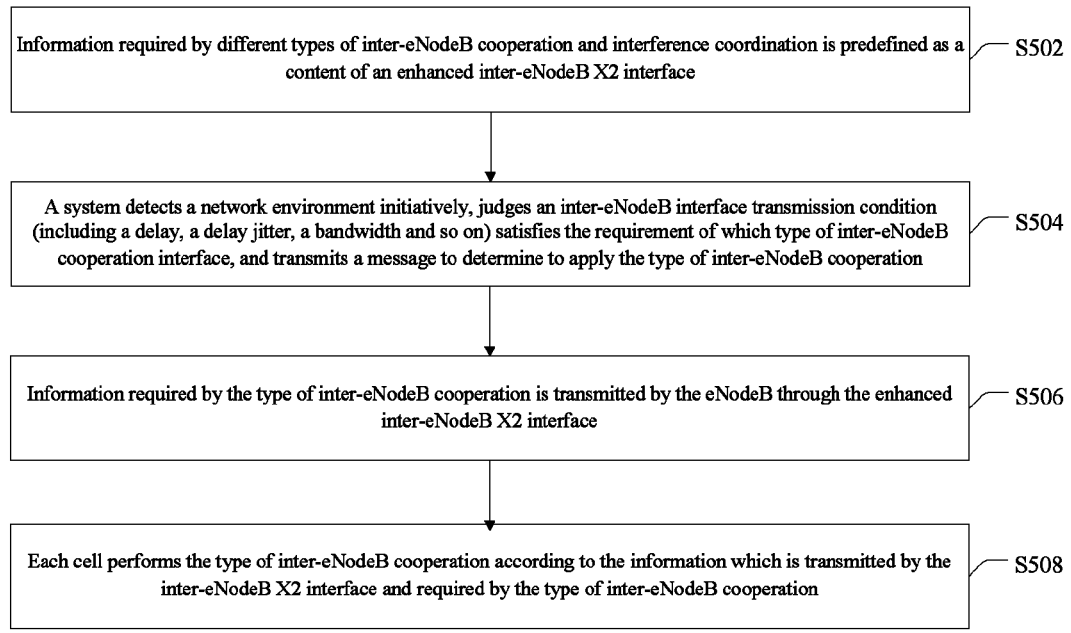
FIG. 5 is a flowchart of inter-eNodeB cooperative communication according to an example embodiment of the present disclosure.

In the present preferred embodiment, a connection of an IP-based interface is established among eNodeBs to transmit information and data to perform inter-eNodeB cooperation and interference coordination. A system detects a network environment initiatively, and according to interface transmission conditions and different system operation requirements, including different conditions including delays, delay jitters, transmission bandwidths and so on, and different predefined cooperation information transmitted among the eNodeBs by an enhanced X2 interface, and the eNodeBs apply different cooperation modes adaptively, such as physical layer level cooperation, MAC layer level cooperation, RRM function level cooperation and so on. FIG. 5 is a flowchart of inter-eNodeB cooperative communication according to an example embodiment of the present disclosure. As shown in FIG. 5, the inter-eNodeB cooperative communication includes the following steps.

Step 502: Information required by different types of inter-eNodeB cooperation and interference coordination is predefined as a content of an enhanced inter-eNodeB X2 interface.

Step 504: A system detects a network environment initiatively, judges an inter-eNodeB interface transmission condition (including a delay, a delay jitter, a bandwidth and so on) satisfies the requirement required by which type of the inter-eNodeB cooperation interface, and transmits a message to determine to apply the type of inter-eNodeB cooperation.

The system detects the network environment initiatively, and a solution for judging the interface transmission condition may be a centralized control solution, and may be also a distributed control solution. In the centralized control solution, a centralized control unit initiates a signaling for detecting the network environment. After receiving the signaling for detecting the network environment, an interface transmission condition detection unit of each eNodeB detects an interface transmission condition (including a delay, a delay jitter, a transmission bandwidth and so on) with other eNodeB, and subsequently feeds back the interface transmission condition with the other eNodeB to the centralized control unit. The centralized control unit collects information of interface transmission conditions among eNodeBs, determines, according to the information of the interface transmission conditions, a type of cooperation mode applied among the eNodeBs, and then transmits a decision to each eNodeB. In the distributed control solution, an interface transmission condition detection unit of each eNodeB initiatively initiates detection of the network environment, detects an interface transmission condition with other eNodeB, and a message is transmitted among eNodeBs to determine a type of cooperation mode applied among other eNodeBs. The timing to initiate the detection of the network environment is preferably that the detection of the network environment is initiated when a network load is relatively low.

A condition required by a type of cooperation mode applied among eNodeBs may be preferably judged according to the following method: for example, an inter-eNodeB interface condition required by cooperation based on a physical layer is: a delay of an inter-eNodeB interface is required to be relatively small (it is required that the delay of the interface is within 1 ms according to an HARQ time sequence requirement and the time required by current signal processing), a delay jitter is required to be relatively small (it is required that a transmission delay jitter of the interface is within a level of a hundred nanoseconds at most according to the HARQ time sequence requirement and the time required by the current signal processing), and a bandwidth is required to be relatively large (determined by a system bandwidth, the number of receiving antennae, and the number of symbol bits).

For example, an inter-eNodeB interface condition required by cooperation based on an MAC layer is as follows: a delay of an inter-eNodeB interface, a delay jitter and a bandwidth can satisfy a requirement of MAC layer coordination (according to the HARQ time sequence requirement and the time required by the current signal processing, it is required that the transmission delay of the interface needs to be within about 1 ms, and the jitter needs to be at a level of a hundred nanoseconds at most, and the bandwidth of the interface is sufficient to transmit a related control signaling and so on).

For example, an inter-eNodeB interface condition required by cooperation based on an RRM function is as follows: the quality of an interface among the eNodeBs fails to satisfy a requirement of the cooperation based on the MAC layer, for example, a transmission time delay and a delay jitter are relatively large, or a transmission bandwidth is deficient, but the transmission delay, the delay jitter and the bandwidth can still satisfy a requirement of RRM layer coordination (it is required that the transmission delay of the interface is within a magnitude of about 10 ms, and the jitter needs to be within a magnitude of 10 ms).

Step 506: An eNodeB transmits, through the enhanced inter-eNodeB X2 interface, information required by the type of inter-eNodeB cooperation. For example, information of cooperation based on a physical layer, that needs to be transmitted by an inter-eNodeB interface in is transmitted by an XP2 interface. For example, information of cooperation based on an MAC layer, that needs to be transmitted by an inter-eNodeB interface in is transmitted by an XM2 interface. For example, information of cooperation based on an RRM function, that needs to be transmitted by an inter-eNodeB interface is transmitted by an XR2 interface.

Step 508: Each cell performs the type of inter-eNodeB cooperation according to the information which is transmitted by the inter-eNodeB X2 interface and required by the type of inter-eNodeB cooperation, such as the cooperation based on the physical layer, e.g. CoMP, dynamic ICIC, centralized scheduling and so on, the cooperation based on the MAC layer, e.g. centralized scheduling and so on, the cooperation based on the RRM function, e.g. inter-cell cooperation and interference coordination based on an ABS pattern, (e)ICIC and so on.

Example Embodiment 2

The present example embodiment provides an inter-eNodeB cooperation and interference coordination method, applicable to a mobile communication system, especially an LTE-A system. Detailed introduction will be provided below in combination with specific steps.

Figure 6:
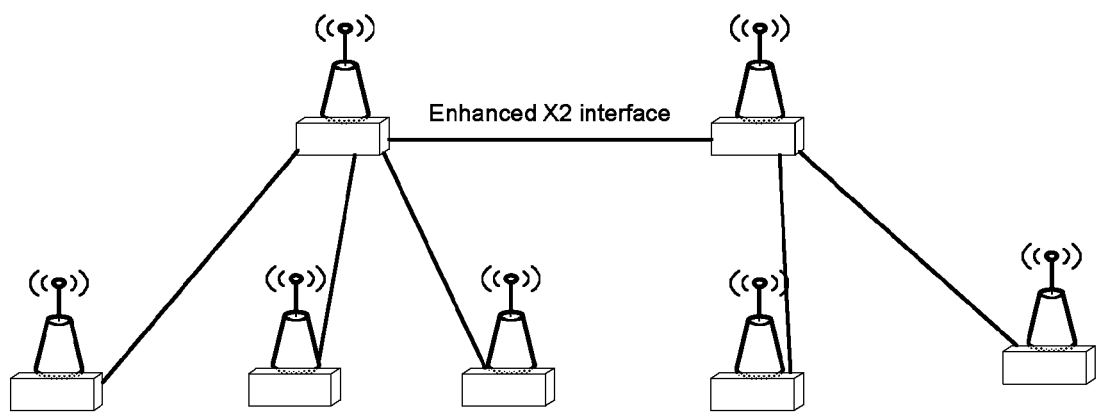
FIG. 6 is a distributed architecture diagram according to an example embodiment of the present disclosure.

In an LTE-A homogeneous network, a system detects a network environment initiatively. FIG. 6 is a distributed architecture diagram according to an example embodiment of the present disclosure. As shown in FIG. 6, a type of inter-eNodeB cooperation mode is determined adaptively according to an inter-eNodeB interface condition and a system operation requirement, and predefined information required by the type of inter-eNodeB cooperation is transmitted among eNodeBs through an enhanced X2 interface. The eNodeBs perform the inter-eNodeB cooperation according to the information transmitted by the enhanced inter-eNodeB X2 interface. Besides, the amount of data transmitted among the eNodeBs may also change in real time, thus it is unnecessary to measure an inter-eNodeB interface transmission condition in real time to determine which type of inter-eNodeB cooperation mode applicable for an inter-eNodeB interface transmission condition at a current moment.

Specific implementation steps of the present example embodiment are as follows.

A preparation step: Information required by different types of inter-eNodeB cooperation and interference coordination is predefined as a content of an enhanced inter-eNodeB X2 interface.

Step 1: A system detects a network environment initiatively, judges that requires an inter-eNodeB interface transmission condition (including a delay, a delay jitter, a bandwidth and so on) satisfies the requirement required by which type of inter-eNodeB cooperation interface, and transmits a message to determine to apply the type of inter-eNodeB cooperation.

The system detects the network environment initiatively, and a solution for judging the interface transmission condition may be a centralized control solution, and may be also a distributed control solution. In the centralized control solution, a centralized control unit initiates a signaling for detecting the network environment. After receiving the signaling for detecting the network environment, an interface transmission condition detection unit of each eNodeB detects an interface transmission condition (including a delay, a delay jitter, a transmission bandwidth and so on) with other eNodeB, and subsequently feeds back the interface transmission condition with the other eNodeB to the centralized control unit. The centralized control unit collects information of interface transmission conditions among eNodeBs, determines, according to the information of the interface transmission conditions, a type of cooperation mode applied among the eNodeBs, and then transmits a decision to each eNodeB. In the distributed control solution, an interface transmission condition detection unit of each eNodeB initiatively initiates detection of the network environment, detects an interface transmission condition with other eNodeB, and a message is transmitted among eNodeBs to determine a type of cooperation mode of the cooperation with other eNodeBs. The timing to initiate the detection of the network environment is preferably that the detection of the network environment is initiated when a network load is relatively low.

A condition required to apply a type of cooperation mode among the eNodeBs may be preferably judged according to the following method.

For example, an inter-eNodeB interface condition required by cooperation based on a physical layer is: a delay of an inter-eNodeB interface is required to be relatively small (it is required that the delay of the interface is within 1 ms according to an HARQ time sequence requirement and the time required by current signal processing), a delay jitter is required to be relatively small (it is required that a transmission delay jitter of the interface is within a level of a hundred nanoseconds at most according to the HARQ time sequence requirement and the time required by the current signal processing), and a bandwidth is required to be relatively large (determined by a system bandwidth, the number of receiving antennae, and the number of symbol bits).

For example, an inter-eNodeB interface condition required by cooperation based on an MAC layer is as follows: a delay of an inter-eNodeB interface, a delay jitter and a bandwidth can still satisfy a requirement of MAC layer coordination (according to the HARQ time sequence requirement and the time required by the current signal processing, it is required that the transmission delay of the interface needs to be within about 1 ms, and the jitter needs to be at a level of a hundred nanoseconds at most, and the bandwidth of the interface is sufficient to transmit a related control signaling and data).

For example, an inter-eNodeB interface condition required by cooperation based on an RRM function is as follows: the quality of an interface among the eNodeBs fails to satisfy a requirement of the cooperation based on the MAC layer, for example, a transmission time delay and a delay jitter are relatively large, or a transmission bandwidth is deficient, but the transmission delay, the delay jitter and the bandwidth can still satisfy a requirement of RRM layer coordination (it is required that the transmission delay of the interface is within a magnitude of about 10 ms, and the jitter needs to be within a magnitude of 10 ms).

Step 2: The information required by the type of inter-cell cooperation is transmitted through the enhanced inter-eNodeB X2 interface.

For example, information of the cooperation based on a physical layer, that needs to be transmitted by an inter-eNodeB interface, is transmitted by an XP2 interface.

For example, information of the cooperation based on an MAC layer, that needs to be transmitted by an inter-eNodeB interface, is transmitted by an XM2 interface.

For example, information of the cooperation based on an RRM function, that needs to be transmitted by an inter-eNodeB interface, is transmitted by an XR2 interface.

Step 3: Each cell performs the type of inter-eNodeB cooperation according to the information which is transmitted by the enhanced inter-eNodeB X2 interface and required by the type of inter-eNodeB cooperation.

The method provided by the present preferred embodiment can more effectively solve the problem of inter-eNodeB cooperation and interference coordination in different situations and inter-eNodeB interface conditions, thus improving frequency efficiency and cell throughput.

Example Embodiment 3

The present example embodiment provides a method of inter-eNodeB cooperation and interference coordination, applicable to a mobile communication system, especially an LTE-A system. Detailed introduction will be provided below in combination with specific steps.

Figure 7:
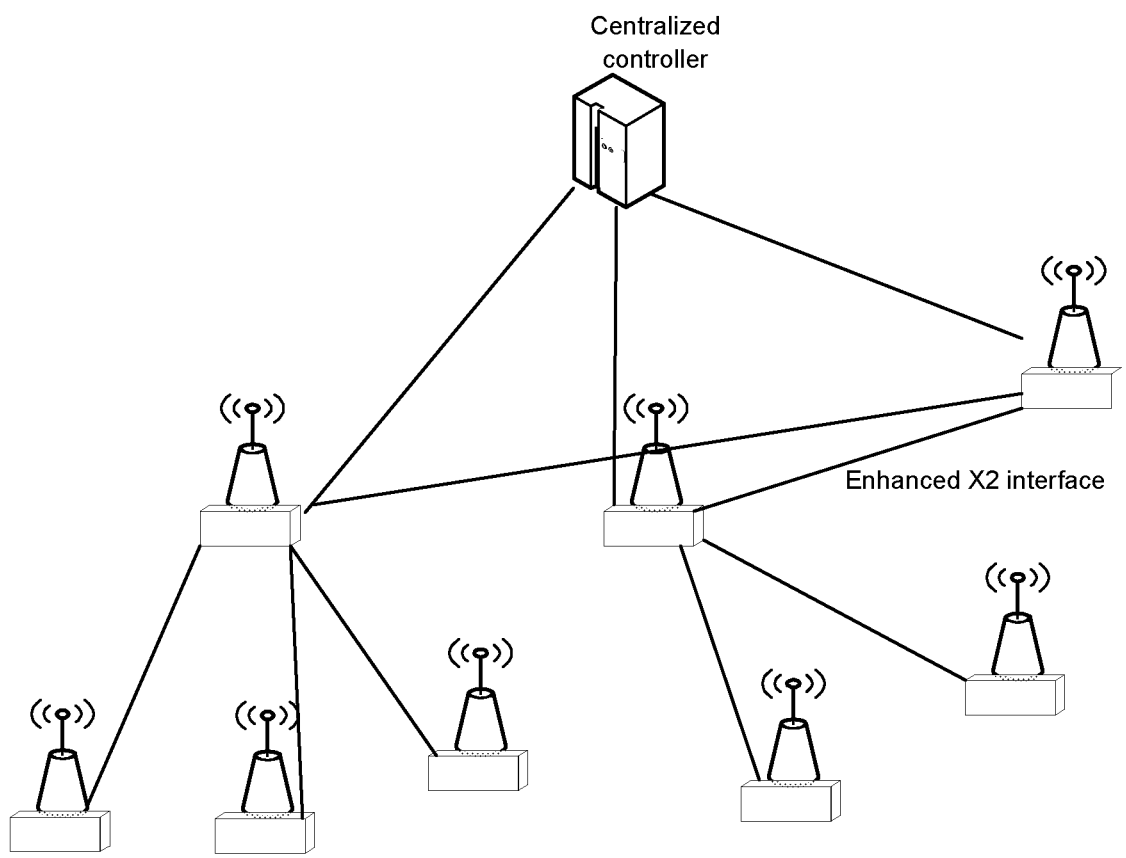
FIG. 7 is a centralized architecture diagram according to an example embodiment of the present disclosure.

In an LTE-A network, there is a networking solution at present, i.e. a plurality of eNodeBs is connected to a centralized controller by an interface. FIG. 7 is a centralized architecture diagram according to an example embodiment of the present disclosure. As shown in FIG. 7, the centralized controller may perform centralized scheduling of an MAC layer and/or centralized ICIC of an RRM layer. Besides, the amount of data transmitted among the eNodeBs may also change in real time, thus it is unnecessary to measure an inter-eNodeB interface transmission condition in real time to determine an applicable type of inter-eNodeB cooperation mode for an inter-eNodeB interface transmission condition at a current moment.

Specific implementation steps of the present example embodiment are as follows.

A preparation step: Information required by different types of inter-eNodeB cooperation and interference coordination is predefined as a content of an inter-eNodeB IP-based interface.

Step 1: A system detects a network environment initiatively, judges an inter-eNodeB interface transmission condition (including a delay, a delay jitter, and a bandwidth and so on) satisfies the requirement required by which type of inter-eNodeB cooperation interface, adaptively determines the type of inter-eNodeB cooperation and transmits a message among eNodeBs.

The system detects the network environment initiatively, and a solution for judging the interface transmission condition may be a centralized control solution, and may be also a distributed control solution. In the centralized control solution, a centralized control unit initiates a signaling for detecting the network environment. After receiving the signaling for detecting the network environment, an interface transmission condition detection unit of each eNodeB detects an interface transmission condition (including a delay, a delay jitter, a transmission bandwidth and so on) with other eNodeBs, and subsequently feeds back the interface transmission condition with the other eNodeB to the centralized control unit. The centralized control unit collects information of interface transmission conditions among eNodeBs, determines, according to the information of the interface transmission conditions, a type of cooperation mode applied among the eNodeBs, and then transmits a decision to each eNodeB. In the distributed control solution, an interface transmission condition detection unit of each eNodeB initiatively initiates detection of the network environment, detects an interface transmission condition with other eNodeB, and a message is transmitted among eNodeBs to determine the type of cooperation mode applied among other eNodeBs. The timing to initiate the detection of the network environment is preferably that the detection of the network environment is initiated when a network load is relatively low.

A condition required to apply a type of cooperation mode among the eNodeBs may be preferably judged according to the following method.

For example, an inter-eNodeB interface condition required by cooperation based on a physical layer is: a delay of an inter-eNodeB interface is required to be relatively small (it is required that the delay of the interface is within 1 ms according to an HARQ time sequence requirement and the time required by current signal processing), a delay jitter is required to be relatively small (it is required that a transmission delay jitter of the interface is within a level of a hundred nanoseconds at most according to the HARQ time sequence requirement and the time required by the current signal processing), and a bandwidth is required to be relatively large (determined by a system bandwidth, the number of receiving antennae, and the number of symbol bits).

For example, an inter-eNodeB interface condition required by cooperation based on an MAC layer is as follows: a delay of an inter-eNodeB interface, a delay jitter and a bandwidth can still satisfy a requirement of MAC layer coordination (according to the HARQ time sequence requirement and the time required by the current signal processing, it is required that the transmission delay of the interface needs to be within about 1 ms, and the jitter needs to be at a level of a hundred nanoseconds at most, and the bandwidth of the interface is sufficient to transmit a related control signaling and data).

For example, an inter-eNodeB interface condition required by cooperation based on an RRM function is as follows: the quality of an interface among the eNodeBs fails to satisfy a requirement of the cooperation based on the MAC layer, for example, a transmission time delay and a delay jitter are relatively large, or a transmission bandwidth is deficient, but the transmission delay, the delay jitter and the bandwidth can still satisfy a requirement of RRM layer coordination (it is required that the transmission delay of the interface is within a magnitude of about 10 ms, and the jitter needs to be within a magnitude of 10 ms).

Step 2: The information required by the type of inter-eNodeB cooperation is transmitted through the inter-eNodeB interface.

For example, information of the cooperation based on a physical layer, that needs to be transmitted by an inter-eNodeB interface, is transmitted by an XP2 interface.

For example, information of the cooperation based on an MAC layer, that needs to be transmitted by an inter-eNodeB interface, is transmitted by an XM2 interface.

For example, information of the cooperation based on an RRM function, that needs to be transmitted by an enhanced inter-eNodeB interface, is transmitted by an XR2 interface.

Step 3: Each eNodeB performs the type of inter-eNodeB cooperation according to the information which is transmitted by the enhanced inter-eNodeB X2 interface and required by the type of inter-eNodeB cooperation.

Example Embodiment 4

The present example embodiment provides a method of inter-eNodeB cooperation and interference coordination, applicable to a mobile communication system, especially an LTE-A system. Detailed introduction will be provided below in combination with specific steps.

Figure 8:
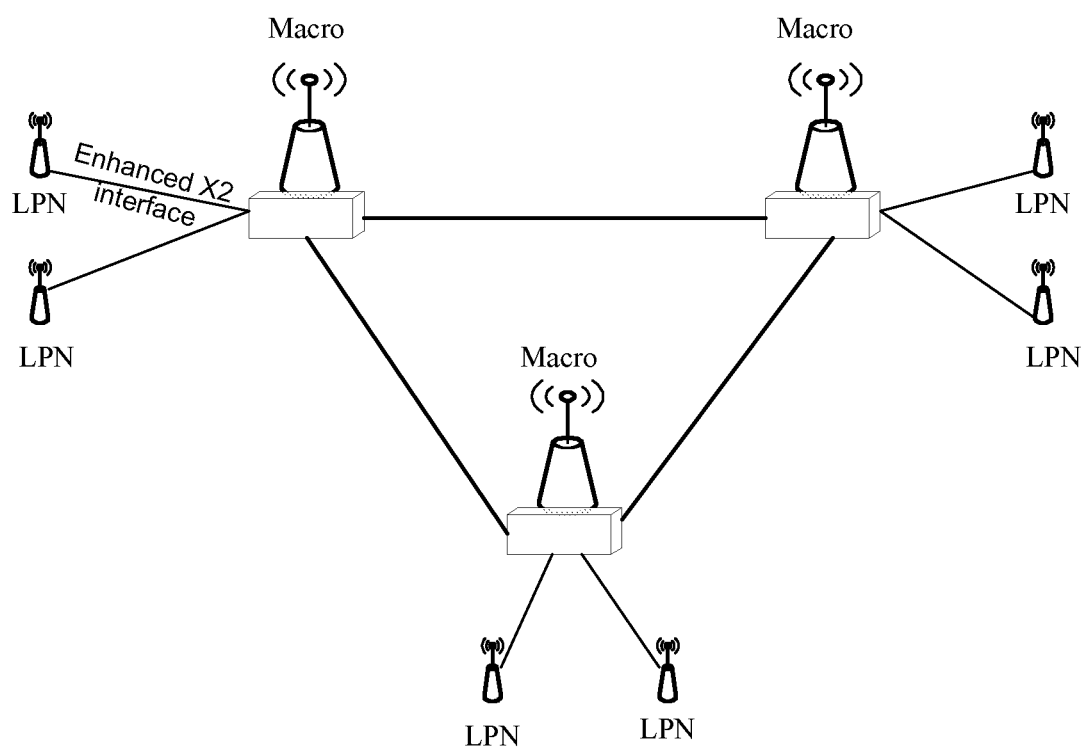
FIG. 8 is a mixed architecture diagram according to an example embodiment of the present disclosure.

In an LTE-A heterogeneous network, an interface condition between an LPN and Macro, and an inter-Macros interface condition may be different. FIG. 8 is a mixed architecture diagram according to an example embodiment of the present disclosure. As shown in FIG. 8, it is necessary to apply different types of inter-eNodeB cooperation in Macro and among Macros. Besides, the amount of data transmitted among the eNodeBs may also change in real time, thus it is unnecessary to measure an inter-eNodeB interface transmission condition in real time to determine an applicable type of inter-eNodeB cooperation mode for an inter-eNodeB interface transmission condition at a current moment.

Specific implementation steps of the present example embodiment are as follows.

A preparation step: Information required by different types of inter-eNodeB cooperation and interference coordination is predefined as a content of an inter-eNodeB IP-based interface.

Step 1: A system detects a network environment initiatively, judges an inter-eNodeB interface transmission condition (including a delay, a delay jitter, and a bandwidth and so on) satisfies the requirement of which type of inter-eNodeB cooperation interface, adaptively determines a type of inter-eNodeB cooperation and transmits a message among cells.

The system detects the network environment initiatively, and a solution for judging the interface transmission condition may be a centralized control solution, and may be also a distributed control solution. In the centralized control solution, a centralized control unit initiates a signaling for detecting the network environment. After receiving the signaling for detecting the network environment, an interface transmission condition detection unit of each eNodeB detects an interface transmission condition (including a delay, a delay jitter, a transmission bandwidth and so on) with other eNodeB, and subsequently feeds back the interface transmission condition with the other eNodeB to the centralized control unit. The centralized control unit collects information of interface transmission conditions among eNodeBs, determines, according to the information of the interface transmission conditions, a type of cooperation mode applied among the eNodeBs, and then transmits a decision to each eNodeB. In the distributed control solution, an interface transmission condition detection unit of each eNodeB initiatively initiates detection of the network environment, detects an interface transmission condition with other eNodeB, and a message is transmitted among eNodeBs to determine a type of cooperation mode applied among other eNodeBs. The timing to initiate the detection of the network environment is preferably that the detection of the network environment is initiated when a network load is relatively low.

A condition required to apply a type of cooperation mode among the eNodeBs may be preferably judged according to the following method.

For example, an inter-eNodeB interface condition required by cooperation based on a physical layer is: a delay of an inter-eNodeB interface is required to be relatively small (it is required that the delay of the interface is within 1 ms according to an HARQ time sequence requirement and the time required by current signal processing), a delay jitter is required to be relatively small (it is required that a transmission delay jitter of the interface is within a level of a hundred nanoseconds at most according to the HARQ time sequence requirement and the time required by the current signal processing), and a bandwidth is required to be relatively large (determined by a system bandwidth, the number of receiving antennae, and the number of symbol bits).

For example, an inter-eNodeB interface condition required by cooperation based on an MAC layer is as follows: a delay of an inter-eNodeB interface, a delay jitter and a bandwidth can still satisfy a requirement of MAC layer coordination (according to the HARQ time sequence requirement and the time required by the current signal processing, it is required that the transmission delay of the interface needs to be within about 1 ms, and the jitter needs to be at a level of a hundred nanoseconds at most, and the bandwidth of the interface is sufficient to transmit a related control signaling and data).

For example, an inter-eNodeB interface condition required by cooperation based on an RRM function is as follows: the quality of an interface among the eNodeBs fails to satisfy a requirement of the cooperation based on the MAC layer, for example, a transmission time delay and a delay jitter are relatively large, or a transmission bandwidth is deficient, but the transmission delay, the delay jitter and the bandwidth can still satisfy a requirement of RRM layer coordination (it is required that the transmission delay of the interface is within a magnitude of about 10 ms, and the jitter needs to be within a magnitude of 10 ms).

Step 2: An enhanced inter-eNodeB X2 interface in Macro and an enhanced inter-eNodeB X2 interface among Macros respectively transmit the information required by the determined type of inter-eNodeB cooperation.

For example, information of the cooperation based on a physical layer, that needs to be transmitted by an inter-eNodeB interface, is transmitted by an XP2 interface.

For example, information of the cooperation based on an MAC layer, that needs to be transmitted by an inter-eNodeB interface, is transmitted by an XM2 interface.

For example, information of the cooperation based on an RRM function, that needs to be transmitted by an inter-cell interface, is transmitted by an XR2 interface.

Step 3: Each cell in Macro performs, according to information which is transmitted by an inter-interference load state information interface and required by a determined type of the cooperation of the inter-interference load state information, the type cooperation of the interference load state information. Each cell among Macros performs, according to information which is transmitted by an inter-interference load state information interface and required by a determined type of the inter-cell cooperation, the type cooperation of the inter-interference load state information.

Example Embodiment 5

The present example embodiment provides a method of inter-eNodeB cooperation and interference coordination, applicable to a mobile communication system, especially an LTE-A system. Detailed introduction will be provided below in combination with specific steps.

Figure 9:
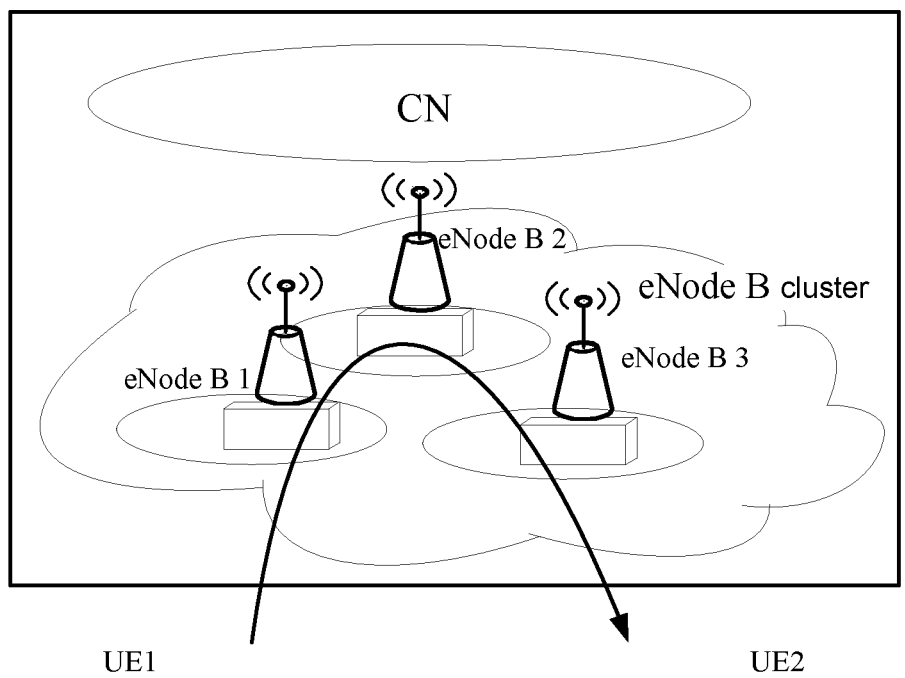
FIG. 9 is an architecture diagram of an eNodeB cluster according to an example embodiment of the present disclosure.

In a future mobile communication network, there may be networking scenarios as follows: FIG. 9 is an architecture diagram of an eNodeB cluster according to an example embodiment of the present disclosure. As shown in FIG. 9, a plurality of eNodeBs forms an eNodeB cluster, and each eNodeB of the eNodeB cluster may function as a routing node. When a calling UE and a called UE are both in the eNodeB cluster, a routing function may be completed by an eNodeB in the cluster without a core network, thereby reducing the processing pressure on the core network and the amount of data transmission.

In such a networking scenario, since the amount of data transmission and interaction among the eNodeBs is irregular and changes in real time, thus an inter-eNodeB transmission interface condition that may be applied to inter-eNodeB cooperation also changes, and needs to be detected frequently to determine an applicable type of inter-eNodeB cooperation for an inter-eNodeB cooperation interface condition of a current moment is applicable.

Specific implementation steps of the present example embodiment are as follows.

A preparation step: Information required by different types of inter-eNodeB cooperation and interference coordination is predefined as a content of an inter-eNodeB IP-based interface.

Step 1: A system detects a network environment initiatively, judges an inter-eNodeB interface transmission condition (including a delay, a delay jitter, and a bandwidth and so on) satisfies the requirement of which type of inter-eNodeB cooperation interface, adaptively determines the type of inter-eNodeB cooperation and transmits a message among cells.

The system detects the network environment initiatively, and a solution for judging the interface transmission condition may be a centralized control solution, and may be also a distributed control solution. In the centralized control solution, a centralized control unit initiates a signaling for detecting the network environment. After receiving the signaling for detecting the network environment, an interface transmission condition detection unit of each eNodeB detects an interface transmission condition (including a delay, a delay jitter, a transmission bandwidth and so on) with other eNodeB, and subsequently feeds back the interface transmission condition with the other eNodeB to the centralized control unit. The centralized control unit collects information of interface transmission conditions among eNodeBs, determines, according to the information of the interface transmission conditions, a type of cooperation mode applied among the eNodeBs, and then transmits a decision to each eNodeB. In the distributed control solution, an interface transmission condition detection unit of each eNodeB initiatively initiates detection of the network environment, detects an interface transmission condition with other eNodeB, and a message is transmitted among eNodeBs to determine the type of cooperation mode applied among other eNodeBs. The timing to initiate the detection of the network environment is preferably that the detection of the network environment is initiated when a network load is relatively low.

A condition required to apply a type of cooperation mode among the eNodeBs may be preferably judged according to the following method.

For example, an inter-eNodeB interface condition required by cooperation based on a physical layer is: a delay of an inter-eNodeB interface is required to be relatively small (it is required that the delay of the interface is within 1 ms according to an HARQ time sequence requirement and the time required by current signal processing), a delay jitter is required to be relatively small (it is required that a transmission delay jitter of the interface is within a level of a hundred nanoseconds at most according to the HARQ time sequence requirement and the time required by the current signal processing), and a bandwidth is required to be relatively large (determined by a system bandwidth, the number of receiving antennae, and the number of symbol bits).

For example, an inter-eNodeB interface condition required by cooperation based on an MAC layer is as follows: a delay of an inter-eNodeB interface, a delay jitter and a bandwidth can still satisfy a requirement of MAC layer coordination (according to the HARQ time sequence requirement and the time required by the current signal processing, it is required that the transmission delay of the interface needs to be within about 1 ms, and the jitter needs to be at a level of a hundred nanoseconds at most, and the bandwidth of the interface is sufficient to transmit a related control signaling and so on).

For example, an inter-eNodeB interface condition required by cooperation based on an RRM function is as follows: the quality of an interface among the eNodeBs fails to satisfy a requirement of the cooperation based on the MAC layer, for example, a transmission time delay and a delay jitter are relatively large, or a transmission bandwidth is deficient, but the transmission delay, the delay jitter and the bandwidth can still satisfy a requirement of RRM layer coordination (it is required that the transmission delay of the interface is within a magnitude of about 10 ms, and the jitter needs to be within a magnitude of 10 ms).

Step 2: The information required by the type of inter-cell cooperation is transmitted by the eNodeB through the enhanced inter-eNodeB X2 interface.

For example, information of the cooperation based on a physical layer, that needs to be transmitted by an inter-eNodeB interface, is transmitted by an XP2 interface.

For example, information of the cooperation based on an MAC layer, that needs to be transmitted by an inter-eNodeB interface, is transmitted by an XM2 interface.

For example, information of the cooperation based on an RRM function, that needs to be transmitted by an inter-eNodeB interface, is transmitted by an XR2 interface.

Step 3: Each cell performs the type of inter-eNodeB cooperation according to the information which is transmitted by the inter-eNodeB interface and required by the type of inter-eNodeB cooperation.

The present example embodiment provides a system and device for inter-cell cooperation. An inter-eNodeB IP-based connection interface is established, different types of interface contents are defined, a system detects a network environment initiatively, different types of cooperation modes are applied adaptively according to different interface transmission conditions and system operation requirements, and different types inter-cell cooperation and interference coordination solutions are applied according to inter-cell coordination information transmitted by the interface, thereby solving the problem of inter-eNodeB cooperation and interference coordination in different situations and inter-eNodeB interface conditions, thus improving frequency efficiency and cell throughput.

Obviously, it should be understood by those skilled in the art that, the above components or steps of the present disclosure may be implemented a universal computing device. They may be centralized on a single computing device or distributed on a network composed of multiple computing devices. Alternatively, they may be implemented by an application code executable by a computing device. Therefore, they may be stored in a storage device and executed by the computing device. Or they may be implemented by respectively fabricating them into integrated circuit components, or by fabricating a plurality of components or steps of them into a single integrated circuit component. Therefore, the present disclosure is not limited to any specific combination of hardware and software.

What are described above are only example embodiments of the present disclosure, but are not for use in limiting the present disclosure, and for those skilled in the art, there may be various modifications and changes to the present disclosure. Any modification, equivalent replacement, improvement and the like made within the spirit and principles of the present disclosure should be included in the protection scope of the present disclosure.

INDUSTRIAL APPLICABILITY

The technical solution provided by the embodiments of the present disclosure may be applied in the field of communications, thus solving the problem inter-eNodeB cooperation in different inter-eNodeB interface conditions in the related art, thus improving the effect of the inter-eNodeB cooperation.

What is claimed is:

1. An inter-eNodeB communication method, comprising:
    detecting an inter-eNodeB interface transmission condition;
    determining a cooperation mode of inter-eNodeB communication according to the detected inter-eNodeB interface transmission condition; and
    performing the inter-eNodeB communication according to the determined cooperation mode;
    wherein the cooperation mode of the inter-eNodeB communication comprises at least one of followings: a cooperation mode of a physical layer, a cooperation mode of a Media Access Control (MAC) layer, and a cooperation mode based on a Radio Resource Management (RRM) function;
    wherein determining the cooperation mode of the inter-eNodeB communication according to the detected inter-eNodeB interface transmission condition comprises: applying the cooperation mode of the physical layer when the inter-eNodeB interface transmission condition satisfies a requirement of the cooperation mode of the physical layer, and applying the cooperation mode of the MAC layer when the inter-eNodeB interface transmission condition fails to satisfy the requirement of the cooperation mode of the physical layer, but satisfies a requirement of the cooperation mode of the MAC layer, and applying the cooperation mode based on the RRM function when the inter-eNodeB interface transmission condition fails to satisfy the requirement of the cooperation mode of the MAC layer, but satisfies a requirement of the cooperation mode based on the RRM function.

2. The method as claimed in claim 1, wherein
    detecting the inter-eNodeB interface transmission condition comprises: initiating, by a centralized control unit, a signaling for detecting the inter-eNodeB interface transmission condition, wherein the centralized control unit is coupled with at least one eNodeB; and
    determining the cooperation mode of the inter-eNodeB communication according to the detected inter-eNodeB interface transmission condition comprises: receiving, by the centralized control unit, the inter-eNodeB interface transmission condition returned by each of the at least one eNodeB, and determining, by the centralized control unit, the cooperation mode of the inter-eNodeB communication of the at least one eNodeB according to the received inter-eNodeB interface transmission condition.

3. The method as claimed in claim 2, wherein detecting the inter-eNodeB interface transmission condition comprises:
    detecting the inter-eNodeB interface transmission condition when a network load is lower than a threshold value.

4. The method as claimed in claim 2, wherein performing the inter-eNodeB communication according to the determined cooperation mode comprises:
    performing the inter-eNodeB communication according to the determined cooperation mode through an Internet Protocol, IP-base interface.

5. The method as claimed in claim 1, wherein
    detecting the inter-eNodeB interface transmission condition comprises: initiating, by an eNodeB, detection of the inter-eNodeB interface transmission condition between the eNodeB and at least one other eNodeB; and
    determining the cooperation mode of the inter-eNodeB communication according to the detected inter-eNodeB interface transmission condition comprises: determining, by the eNodeB, according to the detected inter-eNodeB interface transmission condition between the eNodeB and the at least one other eNodeB, the cooperation mode of the inter-eNodeB communication with the at least one other eNodeB.

6. The method as claimed in claim 5, wherein detecting the inter-eNodeB interface transmission condition comprises:
    detecting the inter-eNodeB interface transmission condition when a network load is lower than a threshold value.

7. The method as claimed in claim 5, wherein performing the inter-eNodeB communication according to the determined cooperation mode comprises:
    performing the inter-eNodeB communication according to the determined cooperation mode through an Internet Protocol, IP-base interface.

8. The method as claimed in claim 1, wherein detecting the inter-eNodeB interface transmission condition comprises:
    detecting the inter-eNodeB interface transmission condition when a network load is lower than a threshold value.

9. The method as claimed in claim 1, wherein the inter-eNodeB interface transmission condition comprises at least one of followings: a transmission delay, a delay jitter, and a transmission bandwidth.

10. The method as claimed in claim 1, wherein performing the inter-eNodeB communication according to the determined cooperation mode comprises:
    performing the inter-eNodeB communication according to the determined cooperation mode through an Internet Protocol (IP)-base interface.

11. An inter-eNodeB communication device, comprising:
    a detecting component, configured to detect an inter-eNodeB interface transmission condition;
    a determining component, configured to determine a cooperation mode of inter-eNodeB communication according to the detected inter-eNodeB interface transmission condition; and
    a communicating component, configured to perform the inter-eNodeB communication according to the determined cooperation mode;
    wherein the cooperation mode of the inter-eNodeB communication comprises at least one of followings: a cooperation mode of a physical layer, a cooperation mode of a Media Access Control (MAC) layer, and a cooperation mode based on a Radio Resource Management (RRM) function;
    wherein the determining component is configured to apply the cooperation mode of the physical layer when the inter-eNodeB interface transmission condition satisfies a requirement of the cooperation mode of the physical layer, and apply the cooperation mode of the MAC layer when the inter-eNodeB interface transmission condition fails to satisfy the requirement of the cooperation mode of the physical layer, but satisfies a requirement of the cooperation mode of the MAC layer, and apply the cooperation mode based on the RRM function when the inter-eNodeB interface transmission condition fails to satisfy the requirement of the cooperation mode of the MAC layer, but satisfies a requirement of the cooperation mode based on the RRM function.

12. The device as claimed in claim 11, wherein
the detecting component and the determining component are located in a centralized control unit, wherein the centralized control unit is coupled with at least one eNodeB; and
the communicating component is located in an eNodeB.

13. The device as claimed in claim 11, wherein the detecting component, the determining component and the communicating component are located in an eNodeB.

14. The device as claimed in claim 11, wherein the detecting component is configured to detect the inter-eNodeB interface transmission condition when a network load is lower than a threshold value.

15. The device as claimed in claim 11, wherein the inter-eNodeB interface transmission condition comprises at least one of followings: a transmission delay, a delay jitter, and a transmission bandwidth.

16. The device as claimed in claim 11, wherein the communicating component is configured to perform the inter-eNodeB communication according to the determined cooperation mode through an Internet Protocol, IP-base interface.

* * * * *